US 6,732,355 B1

(12) United States Patent
Ogasawara

(10) Patent No.: US 6,732,355 B1
(45) Date of Patent: May 4, 2004

(54) METHOD AND DEVICE FOR GENERATING REGISTRATION DATA AT COMPILATION TO ENABLE TRACE OF STACK

(75) Inventor: Takeshi Ogasawara, Hachioji (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/493,763

(22) Filed: Jan. 28, 2000

(30) Foreign Application Priority Data

Jan. 29, 1999 (JP) .......................................... 11-021942

(51) Int. Cl.⁷ .............................. G06F 9/44; G06F 9/45
(52) U.S. Cl. ........................ 717/128; 717/148; 717/162
(58) Field of Search ................................ 717/127, 128, 717/136, 140, 148, 162

(56) References Cited

U.S. PATENT DOCUMENTS

| 5,339,238 A | * | 8/1994 | Benson ......................... 717/159 |
| 5,598,560 A | * | 1/1997 | Benson ......................... 717/159 |
| 6,081,665 A | * | 6/2000 | Nilsen et al. ................. 717/116 |
| 6,148,391 A | * | 11/2000 | Petrick ......................... 712/202 |
| 6,363,521 B1 | * | 3/2002 | Yasue et al. ................... 717/128 |
| 6,463,582 B1 | * | 10/2002 | Lethin et al. ................. 717/158 |
| 6,499,137 B1 | * | 12/2002 | Hunt ............................. 717/164 |

FOREIGN PATENT DOCUMENTS

JP          06-274369          9/1994

* cited by examiner

Primary Examiner—Hoang-Vu Antony Nguyen-Ba
(74) Attorney, Agent, or Firm—Roy W. Truelson

(57) ABSTRACT

To provide a method for enabling a trace of a stack even without the base pointer. When compiling a subroutine, a stack pointer (SP) change table is created and registered with a subroutine together with an initial frame size, the table recording a pair of an address of a code and the amount of change in the stack pointer from the initial frame size, the code causing an address of the stack pointer to be changed, and a thread is caused to pause at a stack tracing time to calculate the be address of the frame from an address of the initial frame, an execution restarting address in this frame and the SP change table registered with a subroutine corresponding to this address and the initial frame size, and thus a trace of a stack is performed.

6 Claims, 6 Drawing Sheets

METHOD AND DEVICE FOR GENERATING REGISTRATION DATA AT COMPILATION TO ENABLE TRACE OF STACK

DETAILED DESCRIPTION OF THE INVENTION

1. Field of the Invention

The present invention relates to a compile method and a method for tracing a stack.

2. Background of the Invention

Presently, Java™ is widely used, not only as a common language for network computing but also as a standard language of object-oriented languages not dependent on any platform. A program written in Java™ is translated into a bytecode which is executed by a Java™ viitual machine. Accordingly, a program once written in Java™ has an advantage that is operates on any computer supporting Java™ regardless of its CPU (multi-platform).

Despite these advantages, execution of a bytecode by a virtual machine is inferior to direct execution of a machine language code in terms of execution performance. Thus, in general, the bytecode is translated into a machine language code (hereafter, referred to as "JITed code") by a JIT compiler during operation of a Java™ program so as to execute a JITed code instead of a bytecode. The minimum unit of compilation is a subroutine called a method. A frequently executed code is translated into a machine language so that performance of a machine language code may be exploited while preserving multi-platform characteristics of a Java™ bytecode.

A JITed code for a method is equal to an optimization code generated by C compiler and so on the point of being a code suited to a CPU on which a program operates. In general, in the currently popular CPUS, if a subroutine is invoked, the subroutine forms on a stack an area for storing a local variable to be used by itself (referred to as a "frame"). FIG. 1 shows a state of a stack when subroutine A has invoked subroutine B and subroutine B has invoked subroutine C. In this drawing, the stack extends upward. The areas represent respective frames of the subroutines. Stack pointer SP points to the top of this stack, namely the top of frame C. If subroutine C further invokes subroutine D, a frame of subroutine D is newly formed from the current SP and the SP points to the top of the frame again. When returning from each subroutine, its frame is removed. For instance, in returning from subroutine D to subroutine C, the frame of subroutine D is removed before returning and the SP returns to the value when subroutine C invoked subroutine D and points to the top of frame C again. In the case of Java™, CPU resources are allocated to each executable unit called a thread which has its own stack (referred to as a "thread stack"). A JITed code creates the above-mentioned frame (hereafter referred to as "JITed frame") on a thread stack.

It is not only a JITed frame that is in a thread stack. A JITed code invokes various service routines provided by a Java™ virtual machine. There are also service routines which further activate a new Java™ virtual machine. FIG. 2 shows a state in which frames of a JITed code and other codes are mixed in a thread stack. The portions with alphabetic characters are JITed frames.

A base pointer is usually used for tracing a stack. For instance, base pointer EBP of x86 (herein EBP) always holds a base address of a current frame in a stack to facilitate detection of a frame in a stack. For instance, in the case of debugging a C program and the like, it is helpful to know invocation relationship of a method by tracing a stack. A frame chain by EBP is often used for this purpose.

As a general compiler optimization technique, particularly an important one for an x86 architecture, which has a smaller number of registers, there is omission of a base pointer. In the above-mentioned example of a C program, when debugging has ended and a final code is to be built, optimization is performed by releasing EBP from a frame chain so that maintenance overhead of the frame chain decreases to allow an EBP register to be allocated as a general register. Thus, a fast code may be generated. This optimization is possible in a language like C, certainly because it is not necessary to trace a stack at a runtime.

In Java™ JIT compiler, such omission of a base pointer is difficult. It is because, in the language specifications of Java™, classLoaderDepth( ) of Java.lang.SecurityManager, countStackFrames( ) of Java.lang.Thread and the like require a function equal to tracing a stack. In addition, there is also necessity of storing in an exception object a stack trace of the time when an exception occurs. These do not function if a base pointer is omitted.

Apart from the above, there is also a cause in a mechanism of JITed code discarding which makes omission of a base pointer difficult. There are cases where, if the memory used by a JIT compiler including a JiTed code is limited or to be limited, only class unload is not sufficient. For instance, in a desktop environment where operation is on a thin client without any virtual memory by a hard disk such as a network computing machine (hereafter, an "NC machine"), multiple Java™ applications such as a mail, a word processor, a scheduler, and the like are simultaneously activated and thousands of methods may be invoked, though a significant percentage of those methods are not present (are not active) in each thread stack. Since class unload only discards a class and its method with no possibility of being used in a Java™ system, a JITed code of such a nonactive method is not discarded. Thus, a JIT compiler has a mechanism of JITed code discarding, which locates an active method in any thread stack and discards a nonactive method (or part of it) to set memory free. To discover an active method correctly and fast, a frame chain to couple only JITed code frames is indispensable.

An object of the present invention is to enable a trace of a stack even in a state where the base pointer is omitted.

SUMMARY OF THE INVENTION

At a compilation time in the present invention, a process is performed: for storing into a storage during a compilation of a method, pairs of an address of a code and information concerning a size of a stack frame after a stack pointer is moved, the code causing an address of the stack pointer to be changed; and for registering a table which is constituted by the pairs and an initial frame size with correspondence to the compiled method. While information of a stack frame size after change is suitably the amount of change in the stack pointer from the initial frame size, it may be the stack frame size itself after the change. In the former case, the table includes the initial frame size, or the initial frame size is provided separately.

If a pause is taken and a trace is performed when such a process is performed at a compilation time and a JITed code is executed in a suitable form, the steps are taken for: obtaining and storing into a storage, an address of an execution code and an address of a stack pointer at a temporary pause for a trace; and calculating and storing into a storage, a base address which is to be pointed by a base pointer by using the address of the execution code, the address of the stack pointer, and the table for the method including the execution code.

On the other hand, if a pause is taken and a trace is performed when a JITed last frame record mode (a mode wherein, if a first method compiled by a predetermined compiler has invoked a second method not compiled by a predetermined compiler, a record pointing to a stack frame of the first method is generated) is adopted in a suitable form and a non-JITed code is executed in a suitable form, the steps are taken for: obtaining and storing into a storage, an address of the stack frame of the first method referring to the record and an execution restarting address which maintained in the stack frame of the first method; and calculating and storing into a storage, a base address which is to be pointed by a base pointer by using the address of the stack frame of the first method, the execution restarting address and the table for the first method.

Thus, tracing a stack is possible even if optimization without the base pointer is performed. Accordingly, the above-mentioned problem of the language specifications of Java™ is solved, and optimization without the base pointer can significantly improve the quality of a Java™ compile code. On the other hand, in an environment where a mechanism of JITed code discarding is adopted, an efficient technique for retrieving an active method can be implemented without reduction in quality.

While the processing flow of the present invention was described as above, the present invention can also be implemented by a device for implementing these processes or a form of a program to have a computer implement these processes. It is normally the responsibility of one having ordinary skill in the art to store this program on storage media such as a floppy disk or a CD-ROM or any other form of storage media.

PREFERRED EMBODIMENTS

Figure 5:
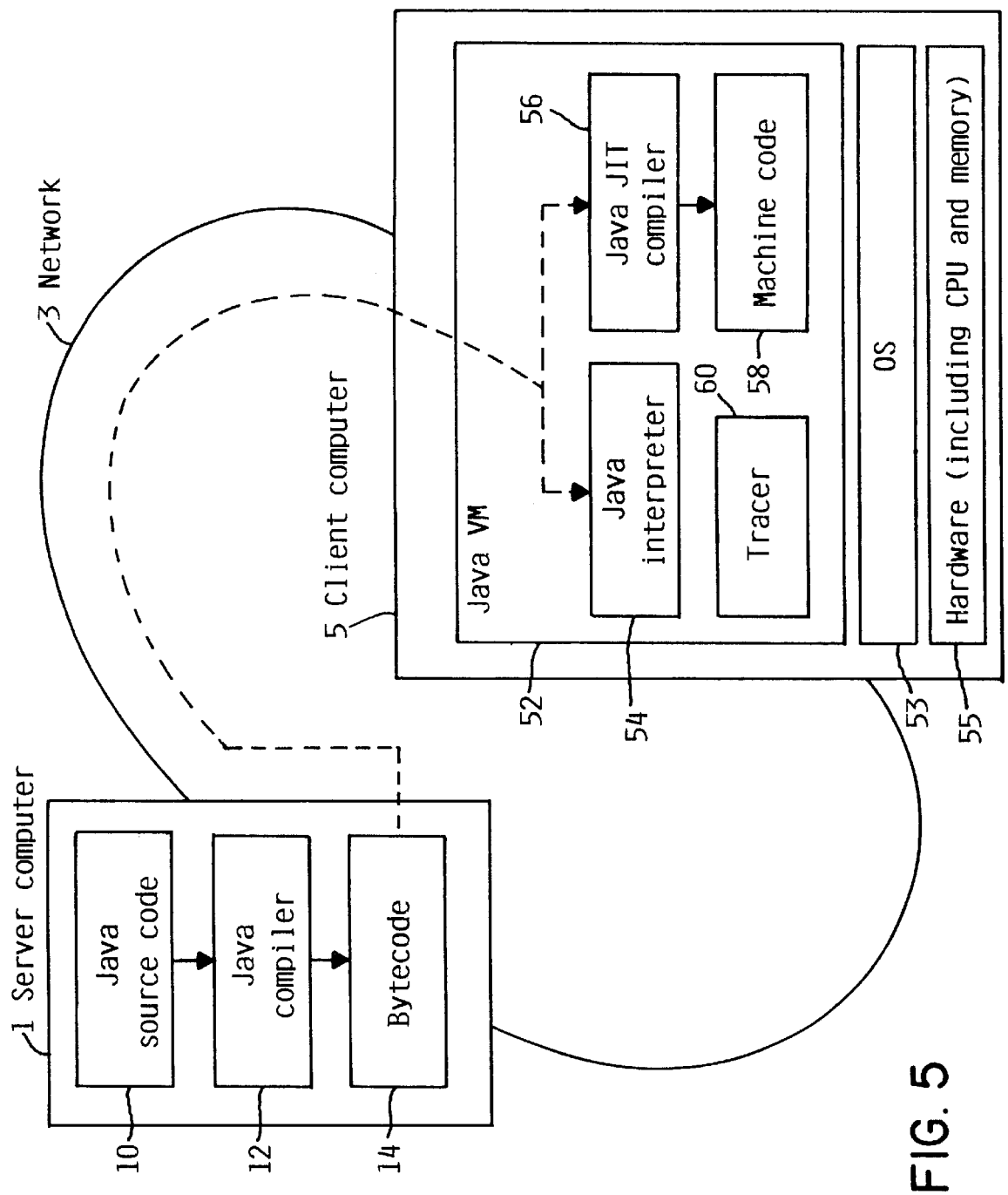
FIG. 5 is a drawing showing an example of device configuration in the present invention.

The device configuration of the present invention is described by using FIG. 5. Server computer 1 and client computer 5 are connected via network 3. Client computer 5 comprises Java™ VM (virtual machine) 52, OS (operating system) 53, and hardware (including CPU and memory) 55. Moreover, Java™ VM 52 comprises Java™ interpreter 54 or Java™ JIT compiler 56 and tracer 60 for tracing a stack. It may also comprise both interpreter 54 and JIT compiler 56.

Meanwhile, client computer 5 may be, other than an ordinary computer, a so-called network computer or a home information appliance which has smaller size of memory or does not include any auxiliary storage such as a hard disk.

On server computer 1, Java™ source code 10 is compiled by a Java™ compiler 12. The result of this compilation is bytecode 14. This bytecode 14 is sent to client computer 5 via network 3. Bytecode 14 is a native code for Java™ Virtual Machine (Java™ VM) 52 installed on a WWW browser (World Wide Web Browser) in client computer 5, etc., and Java™ interpreter 54 or Java™ JIT compiler 56 is used when actually executed on the CPU of hardware 55. Interpreter 54 decodes bytecode 14 at an execution time, and invokes and executes a processing routine prepared for each instruction. On the other hand, JIT compiler 56 translates a bytecode to machine code 58 (also referred to as a machine language code) by using a compiler in advance or immediately before execution and then executes it on the CPU.

JIT compiler 56 and tracer 60 related to the present invention and their relevant functions are described as follows.

Figure 3:
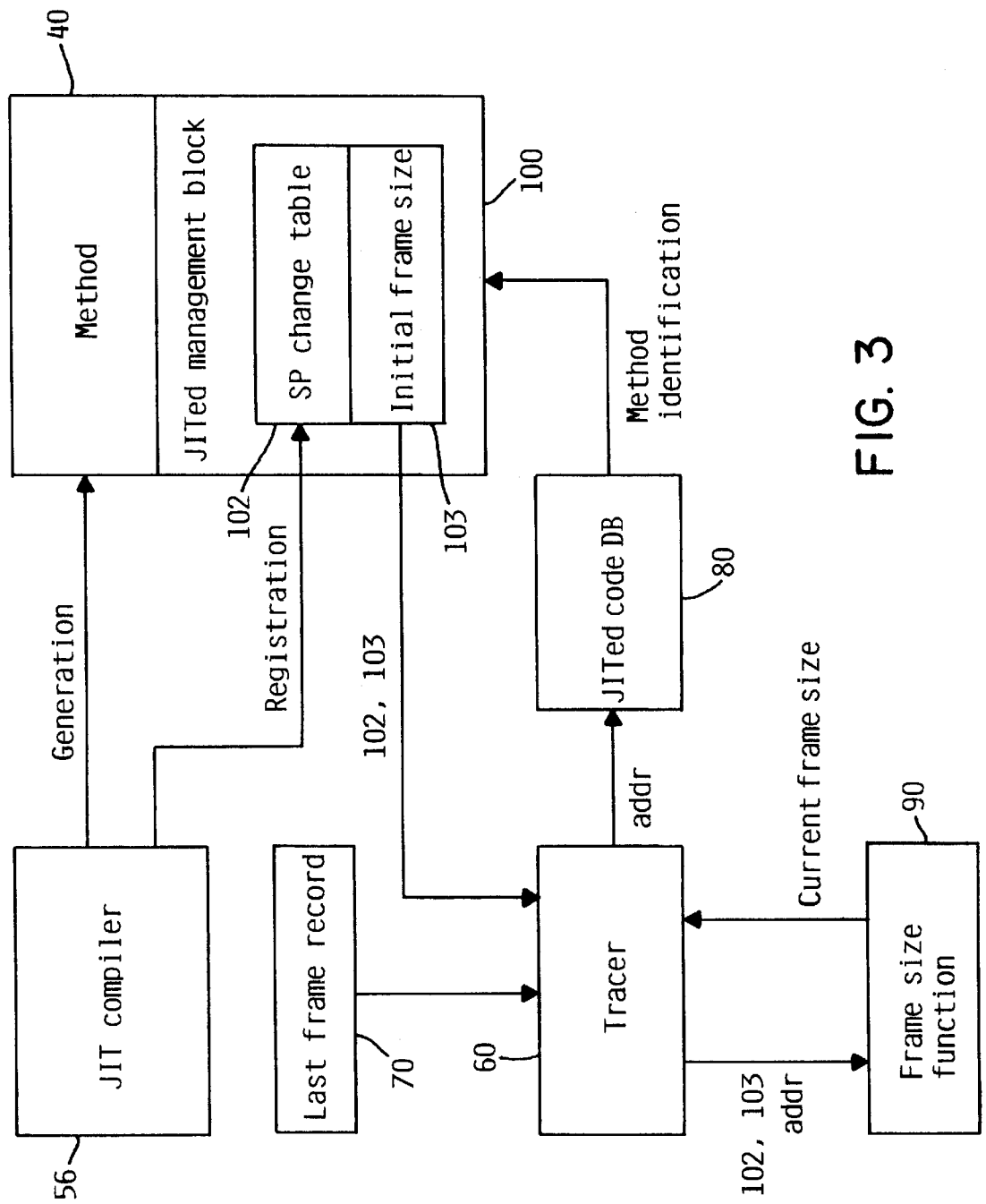
FIG. 3 is a diagram showing operation of a stack trace mode according to the present invention.

FIG. 3 is a block diagram of the functions related to the present invention developed on the main memory of client computer 5. JIT compiler 56 generates machine code 58 from bytecode 14. A machine code of a certain method is shown as method 40 in FIG. 3. JIT compiler 56 generates JITed management block 100 at a compilation time of this method. In addition, JIT compiler 56 registers in JITed management block 100 SP change table 102 and initial frame size 103 related to the present invention. JITed management block 100 is a management block of a method compiled by JIT compiler 56. Moreover, JIT compiler 56 registers generated method 40 in JITed code database (DB) 80 for identifying a method from an address of machine code 58. Method 40, if actually executed, generates last frame record 70. Tracer 60 traces a stack by using this last frame record 70, JITed code DB 80, SP change table 102 and initial frame size 103 identified from JITed code DB 80, frame size function 90 for outputting a current frame size, and a context including an SP and a current effective address (not illustrated).

Figure 6:
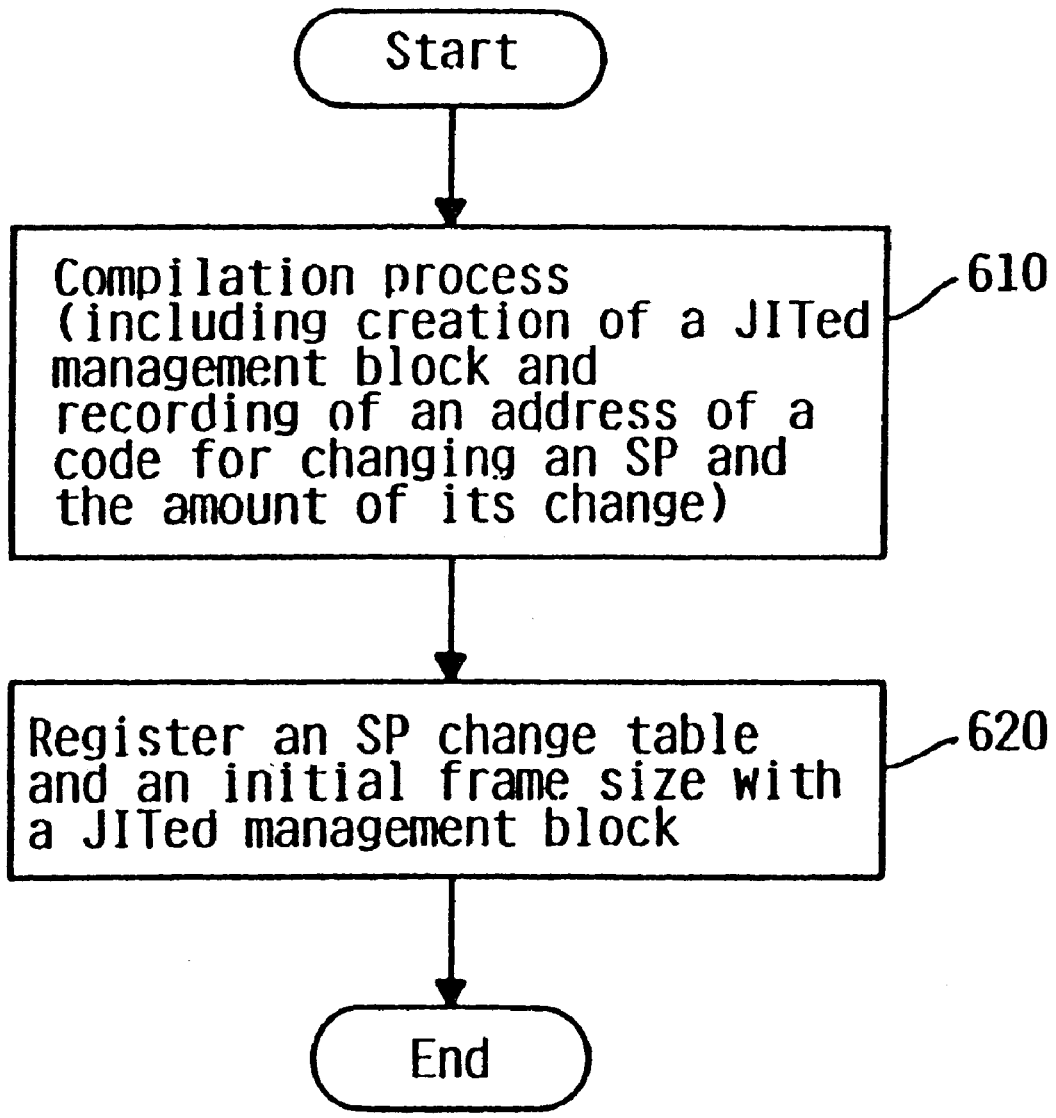
FIG. 6 is a flowchart describing an operation performed by JIT compiler shown in FIGS. 3 and 5 at a compilation time.
Figure 7:
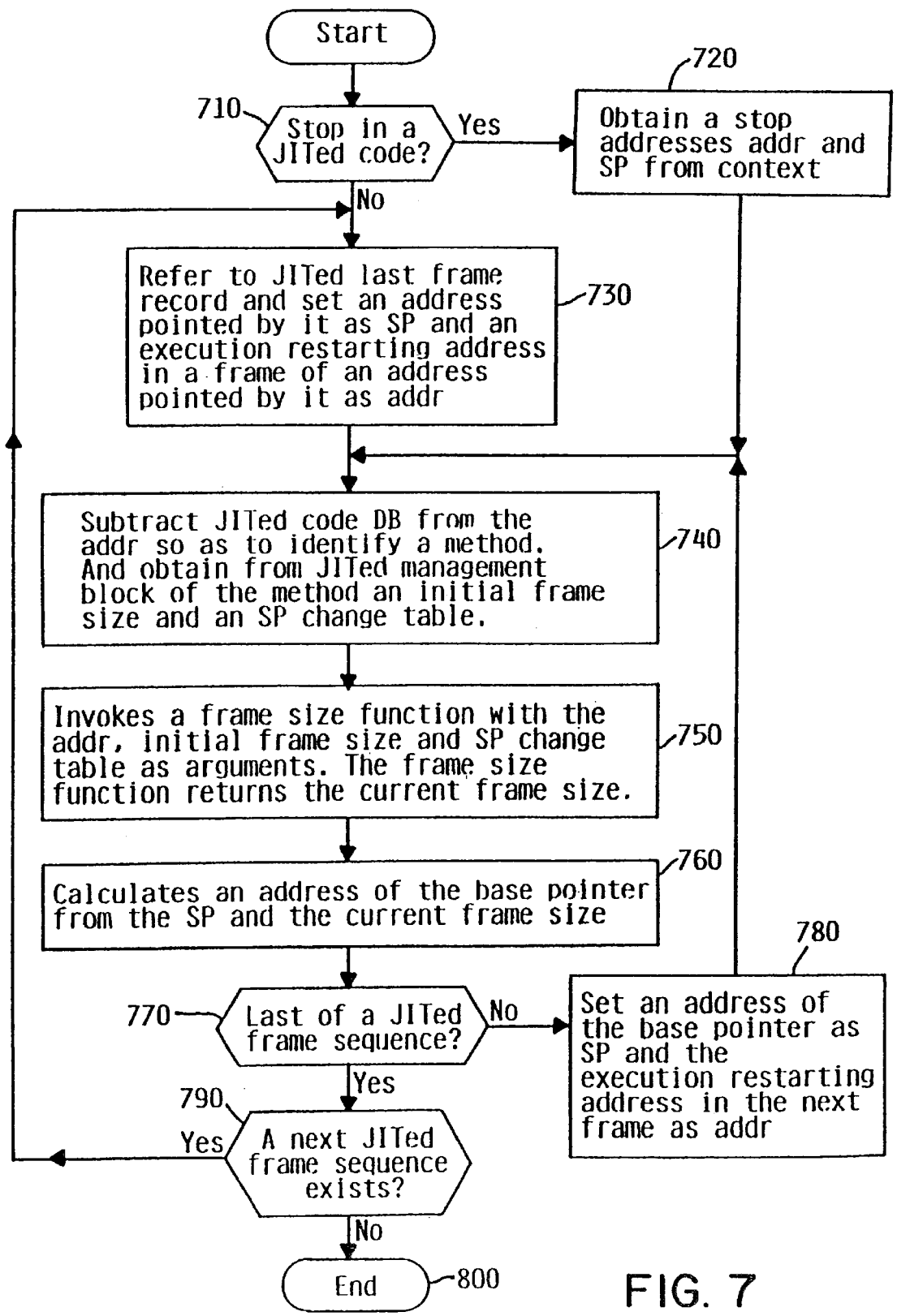
FIG. 7 is a flowchart describing an operation performed by tracer shown in FIGS. 3 and 5 at a tracing time.

Now, operation of each component in FIG. 3 is described in further detail by using FIGS. 6 and 7.

FIG. 6 is an operation performed by JIT compiler 56 at a compilation time. JIT compiler 56 performs a compilation process of a method (step 610). This compilation process includes, in addition to generation of a machine code 58 (method 40 in FIG. 3), creation of SP change table 102 and JITed management block 100. As a matter of course, a created machine code and information are stored in the main memory. If the compilation process ends, initial frame size 103 and final SP change table 102 of a stack frame of the method are registered in JITed management block 100 (step 620). SP change table 102 comprises a pair of an address of a machine code for changing an SP value (can be an offset in the machine code) and the amount of change from the initial frame size, stored in order of addresses. Normally, it is mainly an invocation time of both a method and a library routine (hereafter, refelTed to as "functions") that an address of an SP becomes more than a starting address of an initially created frame. SP change table 102 can be created by recording an address of a machine code for changing an SP value and the amount of change of the SP from the initial frame size each time the compiler generates a machine code for stacking an argument of this invocation of functions on a stack, reserving or deleting a stack area of an argument.

However, sorting is performed with an address as a key since reshuffling of basic blocks or the like may be implemented after generation of a machine code. If reshuffling of basic blocks or the like is not implemented, sorting is performed naturally. SP change table 102 is created for each method. Moreover, the size of SP change table 102 can be small since there are not so many codes which change an SP value.

Figure 4:
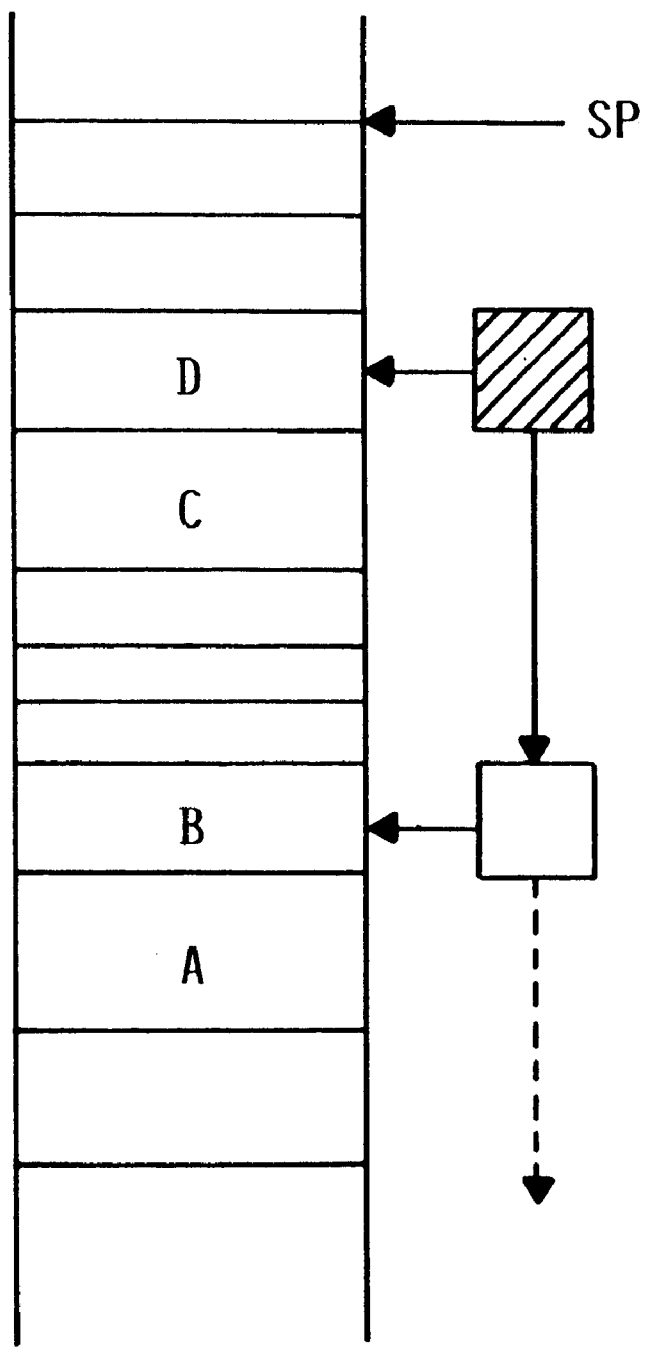
FIG. 4 is a diagram showing a general state of a thread stack at a certain time.

Next an operation performed by tracer 60 and so on at a tracing time is described. However, since the following description is on the precondition that the JITed last frame mode disclosed in Japanese Patent Application No. Hei 10-267842 is used, the mode is briefly explained. FIG. 4 is a diagram which shows a general state of a thread stack at a certain time. A, B, C, and D are JITed frames of a method. A and B, C and D are consecutive (referred to as "JITed frame sequence"). In FIG. 4, □ pointing to the beginning of the JITed frame sequence is a JITed last frame record. This JITed last frame record manages the consecutive JITed frames and constitutes itself a list of LIFO (Last In First Out). A JITed last frame record is created each time a JITed code invokes a not-JITed code such as a service routine, and updates a list. Namely, a JITed code comprises a machine code for generating a JITed last frame record immediately before invoking a service routine or the like. A JITed frame at the beginning of the JITed frame sequence pointed by the JiTed last frame record indicates that ejection from a method to be implemented in the frame to a non-JITed code is taking place. Moreover, in the case that a JITed code is invoked from a non-JITed code, a JITed frame is generated next to a nonJITed frame and this switching is to be separately recorded.

FIG. 7 shows an operation performed by tracer 60 and so on at a tracing time. Meanwhile, a thread is stopped when tracer 60 operates. First, tracer 60 determines whether it is stopped in a JITed code (step 710). It can be determined from a context whether or not it is a JITed code. If it is stopped in a JITed code (for instance, the state of FIG. 1), tracer 60 obtains from the context a stop address addr and an SP (step 720). On the other hand, if it is stopped not in a JITed code but in a non-JITed code (for instance, the state of FIG. 2), tracer 60 obtains, by referring to the uppermost (the newest) information of JITed last frame record (its list) 70, an address pointed by the JITed last frame record and an execution restarting address in a frame of the address which it points to, and sets them respectively as SP and addr (step 730). An execution restarting address is stored in the frame.

Next, tracer 60 subtracts JITed code DB 80 from the obtained addr so as to identify a method. And it obtains from JITed management block 100 of the method initial frame size 103 and final SP change table 102 (its address) (step 740). And tracer 60 invokes frame size function 90 with addr, initial frame size 103, and SP change table 102 (its address) as arguments. Frame size function 90 performs a binary search in SP change table 102 with addr as a key, and obtains the amount of change corresponding to the addr to calculate the current frame size by using the initial frame size. And frame size function 90 returns the current frame size to tracer 60 (step 750). Tracer 60 calculates from the SP and the current frame size a base address of the current frame, namely an address to be pointed by the base pointer (step 760). There is a break of the frame at this address.

Next, tracer 60 determines whether this current frame is the last frame in a JITed frame sequence (step 770). To do this, as an address at a break of the frames is recorded in the case that a non-JITed code invokes a JITed code, this address and the calculated address of the base pointer are just compared. If the current frame is not the last frame in a JITed frame sequence, tracer 60 obtains an execution restarting address in the next (lower) frame, and returns to step 740 with the address of the base pointer as SP and the execution restarting address as addr (step 780).

If the current frame is determined as the last frame in a JITed frame sequence, tracer 60 determines whether or not a next JITed frame sequence exists (step 790). It can be determined by whether or not a record next to JITed last frame record (its list) 70 exists. If a record next to JITed last frame record does not exist, the process terminates (step 800). On the other hand, if a next JITed last frame record exists, step 730 is executed for the next JITed last frame record. And tracer 60 implements processes from step 740 on.

While the above description indicated an example of recording a pair of the amount of change of an SP from the initial frame size and the initial frame size, as the case may be, it is also possible to record a size itself of a stack frame pointed by the SP after a change. In this case, it is not necessary to record the initial frame size.

Meanwhile, any address obtained or calculated during the processes of FIGS. 6 and 7 is stored in storage (main memory for instance).

ADVANTAGES OF THE INVENTION

According to the present invention, it is possible to trace frames even if optimization is performed without the base pointer. Thus, the quality of a Java™ compile code can be significantly improved without changing the language specifications of Java™. On the other hand, in an environment where a mechanism of JITed code discarding is used, it becomes possible to efficiently retrieve an active method.

BRIEF DESCRIPTION OF THE DRAWINGS

Figure 1:
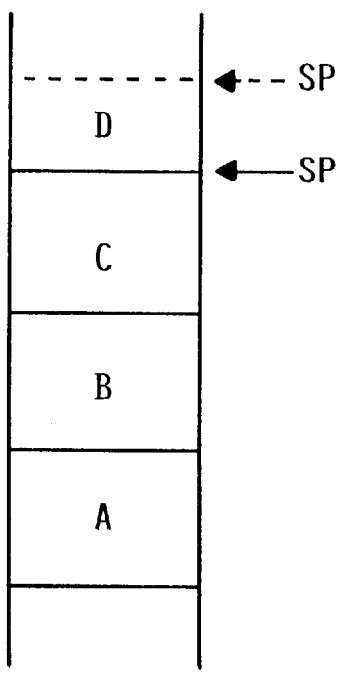
FIG. 1 is a diagram showing a stack when subroutine A has invoked subroutine B and subroutine B has invoked subroutine C.

FIG. 1 is a diagram showing a stack when subroutine A has invoked subroutine B and subroutine B has invoked subroutine C.

Figure 2:
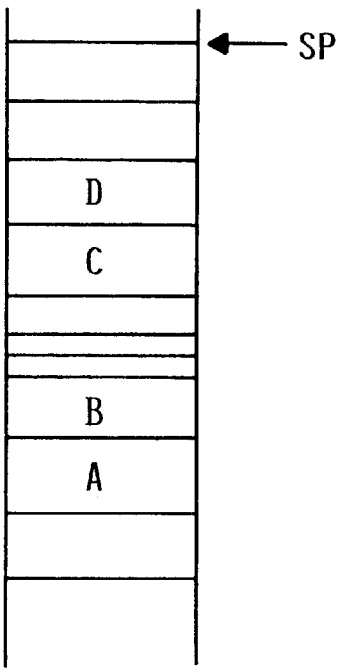
FIG. 2 is a diagram showing a thread stack in which frames of a JITed code and other codes are mixed.

FIG. 2 is a diagram showing a thread stack in which frames of a JITed code and other codes are mixed.

FIG. 3 is a diagram showing operation of a stack trace mode according to the present invention.

FIG. 4 is a diagram showing a general state of a thread stack at a certain time.

FIG. 5 is a drawing showing an example of device configuration in the present invention.

FIG. 6 is a flowchart describing an operation performed by JIT compiler shown in FIGS. 3 and 5 at a compilation time.

FIG. 7 is a flowchart describing an operation performed by tracer shown in FIGS. 3 and 5 at a tracing time.

DESCRIPTIONS OF THE SYMBOLS

1: Server computer
3: Network
5: Client computer
10: Java™ source code
12: Java™ compiler
14: Bytecode
52: Java™ VM
54: Java™ interpreter
56: Java™ JIT compiler
58: Machine code
60: Garbage collector
53: OS
55: Hardware (including CPU and memory)

What is claimed is:

1. A method for tracing a stack, said method comprising the steps of:

tracing execution of a compiled method program having at least one method, each said compiled method program containing a respective stack pointer change table generated during compilation corresponding to each method, each said stack pointer change table comprising at least one stack pointer change table entry, each said stack pointer change table entry containing an address of compiled machine code which changes a stack pointer value and a corresponding data concerning a size of a stack frame after said stack pointer value is changed, each said stack pointer change table being registered with a management block associated with the corresponding method;

when a thread is temporarily stopped during said step of tracing execution of said method program, obtaining and storing a stop address at which execution code is temporarily stopped and a current value of a stack pointer;

identifying a method in which said thread is temporarily stopped;

accessing a first entry in the stack pointer change table corresponding to the method identified by said identifying step, said first entry having an address of compiled machine code which changes a stack pointer value equal to said stop address;

calculating a frame size of said method identified by said identifying step, said frame size being the frame size after execution of the compiled machine code which changes a stack pointer value at the address contained in said first entry, said calculating step using the data concerning a size of a stack frame after said stack pointer value is changed in said first entry; and calculating and storing a base address which is to be pointed by a base pointer by using said current value of said stack pointer and said frame size of said method identified by said identifying step.

2. A The method for tracing a stack of claim 1, wherein said compiled method program invokes at least one service routine, said at least one service routine being compiled separately from said compiled method program, said method for tracing a stack further comprising the steps of:

when a thread is temporarily stopped within execution of a first service routine during said step of tracing execution of said method program, obtaining and storing an address of a stack frame corresponding to a last executed method of said compiled method program and an execution restarting address which is maintained in said stack frame of said last executed method;

accessing a second entry in the stack pointer change table corresponding to said last executed method, said second entry having an address of compiled machine code which changes a stack pointer value equal to said execution restarting address;

calculating a frame size of said last executed method, said calculating step using the data concerning a size of a stack frame after said stack pointer value is changed in said second entry; and calculating and storing a base address which is to be pointed to by a base pointer by using said address of said stack frame of said last executed method and said frame size of said last executed method.

3. The method for tracing a stack of claim 1, wherein each said compiled method program further contains a corresponding initial frame size value, and wherein said data concerning a size of a stack frame after said stack pointer value is changed is represented as an offset from an initial value.

4. A storage medium, said storage medium bearing a tracer, said tracer being configured to carry out the steps of:

tracing execution of a compiled method program having at least one method, each said compiled method program containing a respective stack pointer change table generated during compilation corresponding to each method, each said stack pointer change table comprising at least one stack pointer change table entry, each said stack pointer change table entry containing an address of compiled machine code which changes a stack pointer value and a corresponding data concerning a size of a stack frame after said stack pointer value is changed, each said stack pointer change table being registered with a management block associated with the corresponding method;

when a thread is temporarily stopped during said step of tracing execution of said method program, obtaining and storing a stop address at which execution code is temporarily stopped and a current value of a stack pointer;

identifying a method in which said thread is temporarily stopped;

accessing a first entry in the stack pointer change table corresponding to the method identified by said identifying step, said first entry having an address of compiled machine code which changes a stack pointer value equal to said stop address;

calculating a frame size of said method identified by said identifying step, said frame size being the frame size after execution of the compiled machine code which changes a stack pointer value at the address contained in said first entry, said calculating step using the data concerning a size of a stack frame after said stack pointer value is changed in said first entry; and calculating and storing a base address which is to be pointed by a base pointer by using said current value of said stack pointer and said frame size of said method identified by said identifying step.

5. The storage medium of claim 4, wherein said compiled method program invokes at least one service routine, said at least one service routine being compiled separately from said compiled method program, said tracer further carrying out the steps of:

when a thread is temporarily stopped within execution of a first service routine during said step of tracing execution of said method program, obtaining and storing an address of a stack frame corresponding to a last executed method of said compiled method program and an execution restarting address which is maintained in said stack frame of said last executed method;

accessing a second entry in the stack pointer change table corresponding to said last executed method, said second entry having an address of compiled machine code which changes a stack pointer value equal to said execution restarting address;

calculating a frame size of said last executed method, said calculating step using the data concerning a size of a stack frame after said stack pointer value is changed in said second entry; and calculating and storing a base address which is to be pointed to by a base pointer by using said address of said stack frame of said last executed method and said frame size of said last executed method.

6. The storage medium of claim 4, wherein each said compiled method program further contains a corresponding initial frame size value, and wherein said data concerning a size of a stack frame after said stack pointer value is changed is represented as an offset from an initial value.

* * * * *